June 14, 1966   F. W. ROWBOTTAM   3,255,810
SCREEN ASSEMBLY AND METHOD OF MAKING THE SAME
Filed May 14, 1962   2 Sheets-Sheet 1
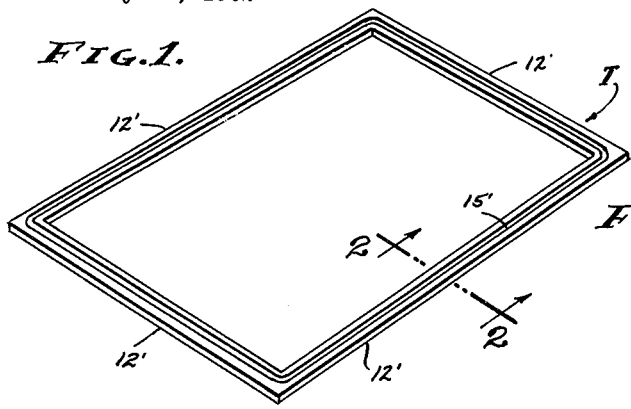
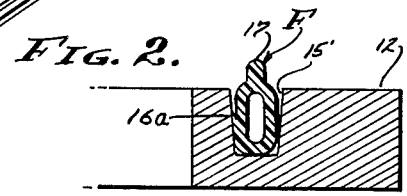
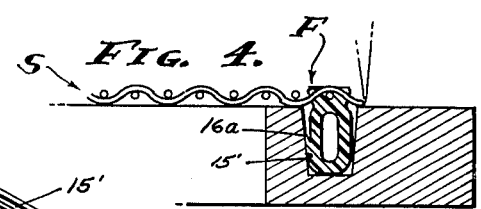
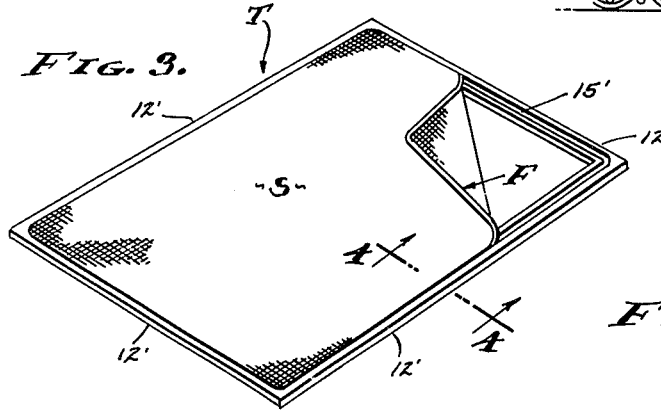
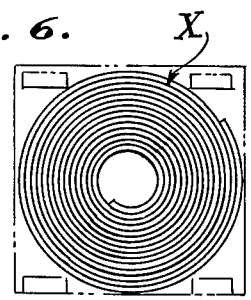
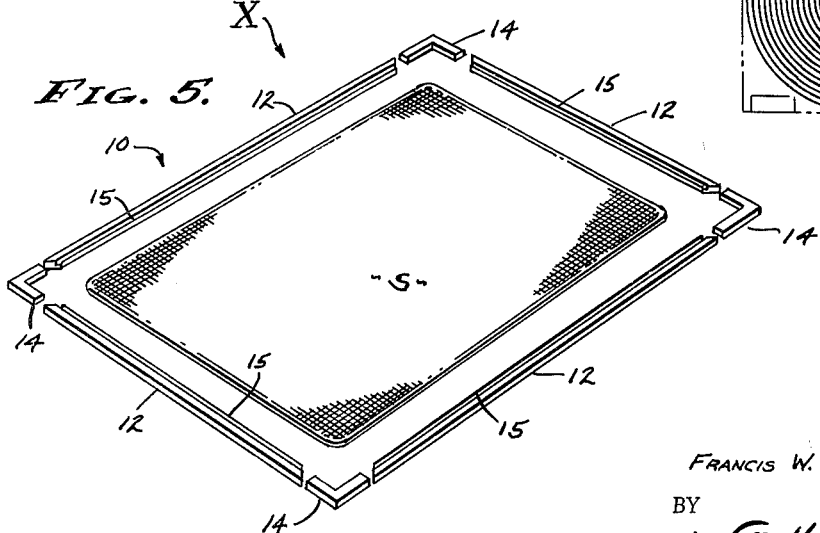
INVENTOR
FRANCIS W. ROWBOTTAM
BY
Wm. H. Maxwell
ATTORNEYS June 14, 1966  F. W. ROWBOTTAM  3,255,810
SCREEN ASSEMBLY AND METHOD OF MAKING THE SAME
Filed May 14, 1962  2 Sheets-Sheet 2
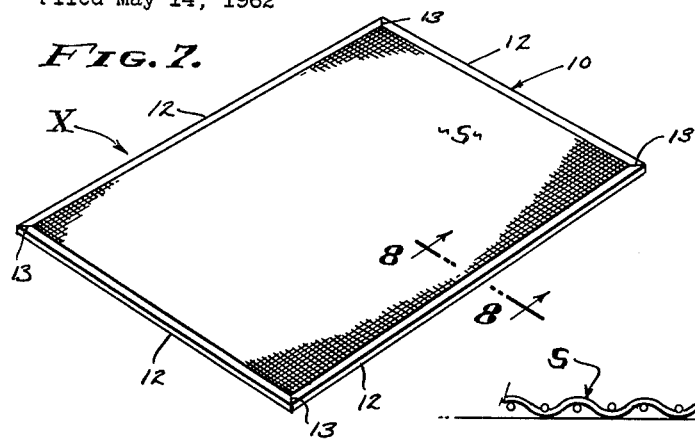
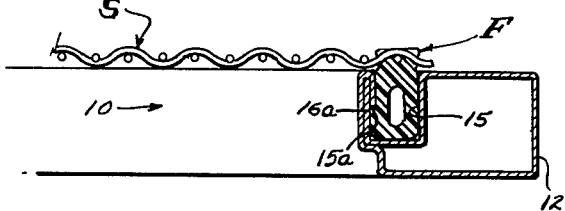
INVENTOR
FRANCIS W. ROWBOTTAM
BY
W. H. Maxwell
ATTORNEYS United States Patent Office 3,255,810
Patented June 14, 1966

3,255,810
SCREEN ASSEMBLY AND METHOD OF MAKING
THE SAME
Francis W. Rowbottam, 1911 W. 139th St.,
Palos Verdes, Calif.
Filed May 14, 1962, Ser. No. 194,416
1 Claim. (Cl. 160—354)

This invention relates to screen assemblies and is particularly concerned with the manufacture and merchandising of prefabricated knock-down screens, it being a general object of this invention to provide a feasible method and article resulting therefrom in the form of packaged prefabricated screening.

Screening is ordinarily installed by hand upon frames that are designed to maintain said screening in a taut planar condition. In order to properly apply screening to frames a technique must be developed whereby appropriate tautness is achieved, but without distorting the frame. The problem arises in the frailty of the frames which are of light construction and which have a rabbet groove for the reception of a retaining strip or filler that wedges the marginal portion of the screening in said rabbet groove. The filler strip is usually applied with an instrument adapted to apply pressure with experienced manipulation, with the screening beneath the filler strip so as to be pressed into the rabbet groove. In any case, the careful manual application of the filler strip to retain the screen in the rabbet grooves is time-consuming, and the output of a skilled workman is rather limited, the installation of said screening being slow and tedious.

The ordinary prior art method as above set forth is not conducive to merchandising of prefabricated screen assemblies. Not because of problems in constructing a suitable frame, but in the technique required in order to properly install a piece of screening. Attempts to install screening by any novice invariably results in a deficient installation, characterized by wrinkles due to over and under tautness. In any case, a novice cannot be relied upon to do a proper job, when manually applying a filler strip to retain screening in the rabbet grooves of a frame.

A factor to be considered in the merchandising of screen assemblies is their size and bulk. Although they are not heavy, their size prohibits ordinary merchandising methods as a shelf article offered for sale to the general public. That is, a retailer cannot give shelf space to such bulky items, and especially since screens are usually considered to be specially made to size. However, the actual fact is that windows and screens follow predetermined proportions and sizes, as a general rule. As a result, screen assemblies are usually made of a standard size to fit a standard window, door, or opening. Only on special occasions are screen assemblies made specially to some unorthodox specification.

An object of this invention is to provide tooling that can be employed in the method of making the screen assemblies herein disclosed.

Another object of this invention is to provide a method whereby a filler strip is attached to a piece of screening in an exact predetermined manner.

It is still another object of this invention to provide screening combined with a marginal strip and prefabricated to an exact predetermined size and shape, and such as to be ready for installation in a frame suited for reception thereof.

It is also an object of this invention to provide screening combined with a marginal strip and such that said combination is flexible so as to be rolled tightly, whereby minimum space is occupied thereby. As a result a package of relatively small cross-sectional configuration is used for merchandising, and frame parts are easily contained therein.

The various objects and features of this invention will be fully understood from the following detailed description of the typical preferred form and application thereof, through which description reference is made to the accompanying drawings, in which:

FIG. 1 is a perspective view of a tool of typical dimensions as provided by the present invention.

FIG. 2 is an enlarged sectional view taken as indicated by line 2—2 on FIG. 1 and showing the insertion of the retaining strips therein.

FIG. 3 is a view similar to FIG. 1 and showing the screening as it is applied to the said tool, and showing the manner in which the screen and strip assembly is peeled from or out of the tool.

FIG. 4 is an enlarged sectional view taken as indicated by line 4—4 on FIG. 3.

FIG. 5 is an exploded view of the components required to make up a screen assembly.

FIG. 6 is a cross-sectional view of the components shown in FIG. 5, as they would appear when packaged.

FIG. 7 is a perspective view similar to FIGS. 1, 3 and 5, and shows a typical screen unit in finished condition.

FIG. 8 is an enlarged sectional view taken as indicated by line 8—8 on FIG. 7, and showing the characteristic features of the assembled unit.

For a proper understanding of this invention it is necessary to have in mind the nature of the finished screen 11 that is produced. The typical frame 10 is a light weight structure made of right angularly related rails 12, adjoining in abutted relationship at mitered corners 13. The rails 12 are tubular and formed of sheet metal, and a right angle fitting 14, shown in FIG. 5, enters abutting rails to join them at said corners, a friction fit being provided. In order for the rail 12 to receive and retain screening S a rabbet groove 15 is provided at the inner marginal portion of the rail, and in the construction of the groove the sheet metal is overlapped and connected. In making this connection at groove 15, the outer plane of metal is turned to form a complete two-sided channel with a bottom, and the edge plane of metal is turned over the marginal portion of the metal forming the outer side of the channel. In any case, the overlapping of metal occurs at one side wall of the channel, at the inner side thereof, and the edge of the exposed overlap terminates at a downwardly faced step 15a spaced from the bottom of the channel. This step 15a locks a retainer strip 16 in place in the finished screen (see FIG. 8), by the engagement of a hook 16a of the strip with said step in a manner to be set forth hereinafter.

With the foregoing usual practice in mind, concerning frame construction, it is usual to force screening S into the channel forming the rabbet groove 15 using a strip or filler, this being a manual operation as hereinabove described. However, with the present invention a strip or filler is not applied as a mechanical key to wedge the screening S in the groove 15. On the contrary, a fusible material F is initially combined with the screening S, being connected by fusion to the screening S. In the preferred form of this invention the fusible material F is vinyl, a pliant and flexible plastic material that is readily fused to the material forming the screening S. It is preferred, also, that the screening be made of vinyl, the same plastic material. It is to be understood, however, that a wide range of equivalent materials can be utilized and that it is possible to fuse to or around metal screening S, or other dissimilar materials, using the fusible material F. This invention is characterized by the connection of screening S onto a flexible strip 16, preferably a fusible strip of material F which is then inserted into the groove 15 in the frame. Although said fusion can be carried out in various ways, it is preferred to employ the direct application of heat, it being understood that chemical action, for example, can be applied, if so desired.

In accordance with the invention, a tool T is fashioned as shown in FIG. 1, having four rails 12' suitably joined at the four corners thereof, and provided with a continuous rabbet groove 15' opening at one side or face of the tool. The groove 15' in practice, is a simple rectangular groove, having a bottom parallel with the face of the tool T and with spaced parallel side walls substantially normal to the face of the tool and slightly divergent for draft purposes. The groove 15' opens at the face of the tool and the retaining strip of material F is inserted therein exposing the material F at the face plane of the tool, and thus the screening S can contact the said fusible material F when brought into flat engagement with said face plane of the tool as later described. In other words, the tool T is an exact duplication in size of the frame 10 into which the screen assembly is to be finally installed.

The strip 16 is of tubular cross-section (see FIG. 2) so as to be compressed somewhat into the groove 15', it has a hook 16a to engage under the step 15a exposed in the channel groove of the frame 10, and it has a projecting rib 17 to be fixed into the mesh of the screening S. As shown, it is only the rib 17 that projects from the said face plane of the tool T.

The method of this invention is practiced by: firstly, inserting a continuous strip of fusible material into the groove of the tool. Secondly, stretching screening S over the face plane of tool T. Thirdly, engaging the screening with said fusible material and fusing the same together. Fourthly, the excess screening S outside of the joint made by fusion is eliminated by trimming with a sharp cutting instrument. Fifthly, the combined screening S and material F is stripped or removed from the tool T, in the form of a finished article, a screen assembly X.

The first step of the method involves the insertion of the retainer strip of material F into the groove 15'. The usual configuration of the tool T and frame 10 is that of a rectangle, although other geometric forms can be used, and the groove 15' and material F continues 360° around the perimeter, inserted into said groove. Of course, there can be one, or more, joints in said material, preferably abutted opposed ends of the material cemented or fused together if so desired. As above described, the rib 17 projects laterally from the face plane of the tool T. Notice that the four straight grooves 15' adjoin at radiused corners, and not at sharp right angles. Thus, the strip 16 is warped around each corner, by bending the same through a curve.

The second step of the method involves stretching of the screening S in a manner to maintain a flat plane thereof, and this requires the engagement of opposite marginal edges of the screening and pulling the same taut. It is usually sufficient to tension the screen from two opposite edges, and in extreme circumstances, as with large screens 11, it is feasible to tension the screen from all four edges. In any case, it is required that the screening S be at least coextensive with the tool T, and by this it is meant that the margins of the screening S overlie the fusible material F of strip 16 to which it is to be attached.

The third step of the method involves bringing of the screening S into engagement with the fusible material F and fusing the same together. In practice, heat is the preferred means of causing the desired fusion, and there are various ways and means suitable for the application of said heat. For example, heat lamps, electronic heat generation or heat applicating irons are all feasible. Since the least complicated is the latter, the ironing means is preferable and is shown in the form of invention illustrated. Thus, a heated iron element 18 is placed in contact with the screening S at the fusible material F, and one or both (S and/or F) are fused into engagement. Said ironing element 18 can be manipulated or mechanically controlled to press against the parts to be joined and to contact, wipe or roll over them, as circumstances require.

As a result of the simple steps above described, and as they are applied to the particular elements involved, a piece of screening S is readily applied to and fastened securely to the strip 16 of material F, with the screening tensioned but not in excess, all without undue strain. Further, the installation of the screening is done in one movement of attachment, said heat being applicable to the entire screen at one short time interval, for example, during but a fraction of a second.

The fourth step of the method involves trimming of the excess screening S outside of the strip 16 of material F. It is preferred that this step be carried out by apparatus as later described; however, this fourth step can be performed with facility at any time while the combined screening S and strip 16 of material F is on the tool T. For example, the rails of the tool T can be used as guides for a trimming cutter.

The fifth step of the method involves the removal of the combined screening S and strip 16 from the tool T, and this step is facilitated by the smooth walls of the groove 15'. That is, there is no locking engagement of the material F in the groove 15', whereby it is a simple matter to strip the screen assembly X from the tool T, as by peeling it backwardly, as clearly shown in FIG. 3.

In FIG. 7 of the drawings the components shown exploded in FIG. 5 are assembled into a finished screen unit 11. Notice that the screen assembly X has squared corners, whereby the strands of the screening are tensioned at said corners, since the corners of strip 16 are initially rounded as above described.

In FIG. 6 of the drawings it will be seen how the finished and flexible screen assembly X can be rolled, or folded, so as to be packed into a relatively small close fitting container. As is indicated, all other components involved in a finished screen unit are included in the package.

Having described only a typical preferred form and application of my invention, I do not wish to be limited or restricted to the specific details herein set forth, but wish to reserve to myself any modifications or variations that may appear to those skilled in the art and fall within the scope of the following claim.

Having described my invention, I claim:

A prefabricated screen assembly for use with a rigid, generally rectangular frame formed with a downwardly extending groove having squared corners, comprising:
   a sheet of normally horizontal flexible screening having marginal edges generally corresponding to the dimensions of said groove;
   and a pliant and flexible strip having its upper end fused onto the marginal edges of said screening to define said assembly, said assembly having rounded corners whereby said strip is insertable downwardly into the groove of said frame to secure said screening to said frame with the strands of said screening being tensioned at said corners.

(References on following page)

References Cited by the Examiner

UNITED STATES PATENTS

| | | | |
|---|---|---|---|
| 2,325,500 | 7/1943 | Fosberg | 160—395 X |
| 2,659,958 | 11/1953 | Johnson | 160—354 X |
| 2,722,978 | 11/1955 | Frisk | 160—354 X |
| 2,886,481 | 5/1959 | Swan | 160—354 X |
| 3,048,897 | 8/1962 | Slade | 160—371 |
| 3,056,361 | 10/1962 | Law | 160—354 X |

FOREIGN PATENTS 336,120  10/1930  Great Britain.

HARRISON R. MOSELEY, *Primary Examiner.*

LAWRENCE CHARLES, BENJAMIN BENDETT, *Examiners.*

R. R. RATH, P. C. KANNAN, *Assistant Examiners.*